(12) United States Patent
Deogharia et al.

(10) Patent No.: US 8,285,908 B2
(45) Date of Patent: Oct. 9, 2012

(54) BUS BRIDGE AND METHOD FOR INTERFACING OUT-OF-ORDER BUS AND MULTIPLE ORDERED BUSES

(75) Inventors: Amar Nath Deogharia, Noida (IN); Hemant Nautiyal, Noida (IN)

(73) Assignee: Freescale Semiconductor, Inc., Austin, TX (US)

( * ) Notice: Subject to any disclaimer, the term of this patent is extended or adjusted under 35 U.S.C. 154(b) by 503 days.

(21) Appl. No.: 12/692,645

(22) Filed: Jan. 24, 2010

(65) Prior Publication Data

US 2011/0185102 A1    Jul. 28, 2011

(51) Int. Cl.
    *G06F 13/36*    (2006.01)
(52) U.S. Cl. .................... 710/306; 710/309; 710/310
(58) Field of Classification Search ............ 710/56, 710/57, 112, 113, 306, 309, 310, 311, 314
    See application file for complete search history.

(56) References Cited

U.S. PATENT DOCUMENTS

| | | | |
|---|---|---|---|
| 6,108,741 A | 8/2000 | MaClaren et al. | |
| 6,304,936 B1 | 10/2001 | Sherlock | |
| 6,615,295 B2 * | 9/2003 | Shah .............................. | 710/54 |
| 6,687,240 B1 * | 2/2004 | Moertl et al. ................ | 370/351 |
| 6,754,737 B2 * | 6/2004 | Heynemann et al. .......... | 710/39 |
| 6,868,469 B2 * | 3/2005 | Bennett et al. ................ | 710/306 |
| 7,000,060 B2 * | 2/2006 | Shah et al. .................... | 710/310 |
| 7,043,593 B1 * | 5/2006 | Tischler et al. .............. | 710/311 |
| 7,308,522 B2 * | 12/2007 | Heynemann et al. ......... | 710/310 |
| 2003/0131175 A1 * | 7/2003 | Heynemann et al. ......... | 710/310 |
| 2006/0174050 A1 * | 8/2006 | Chadha et al. ................ | 710/310 |

OTHER PUBLICATIONS

Creating a PCI Express Interconnect, Ajay V. Bhatt, Intel Corporation, 2002.*

* cited by examiner

*Primary Examiner* — Khanh Dang
(74) *Attorney, Agent, or Firm* — Charles Bergere (57) ABSTRACT

A method for interfacing an out-of-order bus and multiple ordered buses and a bus bridge. The bus bridge includes multiple ordered bus interfaces, where each ordered bus interface is coupled to an ordered bus. A flow control logic circuit is coupled to the out-of-order bus and to the multiple ordered bus interfaces. The flow control logic circuit controls a flow of transaction requests between the out-of-order bus and each of the ordered buses interfaces. The flow control logic circuit includes an updating circuit for updating dependency resolution attributes and data readiness attributes associated with transaction requests, and a shared memory unit for storing the dependency resolution attributes, the data readiness attributes and the transaction requests where the transaction requests are destined to the ordered buses. A managing circuit, coupled to the shared memory unit and to the multiple ordered bus interfaces, is used to determine a readiness of each transaction request based on a dependency resolution attribute and a data readiness attribute associated with the transaction request, and for managing a dequeueing of ready transaction requests to the ordered bus interfaces based on an availability of the ordered bus interfaces.

20 Claims, 6 Drawing Sheets

BUS BRIDGE AND METHOD FOR INTERFACING OUT-OF-ORDER BUS AND MULTIPLE ORDERED BUSES

BACKGROUND OF THE INVENTION

The present invention relates to a bus bridge and to a method for interfacing an out-of-order bus with multiple ordered buses.

A bus bridge is used to interface different types of buses such as ordered buses and out-of-order buses. In Out-of-order buses a single transaction (read or write) is split into an address phase and a data phase. The address and data phases are spaced in time and the order in which the data phases are issued may differ from the order in which the address phases were issued. Both of the address and data phases include one or more clock cycles.

A many-to-one bus bridge may interface a single out-of-order bus and multiple ordered buses. Each ordered bus interface has a buffer and control logic for compensating for timing differences between the different buses and for facilitating protocol conversions.

The duplication of buffers and control logic for each ordered bus interface is not efficient. Thus, there is a growing need to provide an efficient bus bridge and a method for interfacing an out-of-order bus and multiple ordered buses.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the drawings are illustrated for simplicity and clarity and have not necessarily been drawn to scale.

DETAILED DESCRIPTION OF THE PREFERRED EMBODIMENTS

The illustrated embodiments of the present invention may for the most part, be implemented using electronic components and circuits known to those skilled in the art and therefore, details will not be explained in any greater extent than that considered necessary for the understanding and appreciation of the underlying concepts of the present invention and in order not to obfuscate or distract from the teachings of the present invention.

In one embodiment, the present invention provides a bus bridge including multiple ordered bus interfaces. Each ordered bus interface is coupled to an ordered bus. A flow control logic circuit is coupled to an out-of-order bus and to the multiple ordered bus interfaces. The flow control logic circuit controls a flow of transaction requests between the out-of-order bus and each of the ordered bus interfaces. The flow control logic circuit includes an updating circuit for updating dependency resolution attributes and data readiness attributes associated with transaction requests; a shared memory unit for storing the dependency resolution attributes, the data readiness attributes and the transaction requests, wherein the transaction requests are destined to the ordered buses; and a managing circuit, coupled to the shared memory unit and to the multiple ordered bus interfaces, for determining a readiness of each transaction request based on a dependency resolution attribute and a data readiness attribute associated with the transaction request, and for managing a dequeueing of ready transaction requests to the ordered bus interfaces based on an availability of the ordered bus interfaces.

In another embodiment, a method for interfacing an out-of-order bus with multiple ordered buses is provided. The method includes receiving transaction requests from the out-of-order bus; controlling a flow of the transaction requests between the out-of-order bus and each of the ordered buses interfaces; and performing transactions between the out-of-order bus and the ordered buses based on the flow of transaction requests. Controlling the flow of transaction requests includes updating dependency resolution attributes and data readiness attributes associated with transaction requests; storing transaction requests, dependency resolution attributes and data readiness attributes; determining a readiness of each transaction request based on a dependency resolution attribute and a data readiness attribute associated with the transaction request; and managing a dequeueing of ready transaction requests to the ordered bus interfaces based on an availability of the ordered bus interfaces.

These and other aspects of the invention will be apparent from and elucidated with reference to the embodiments described hereinafter.

Figure 1:
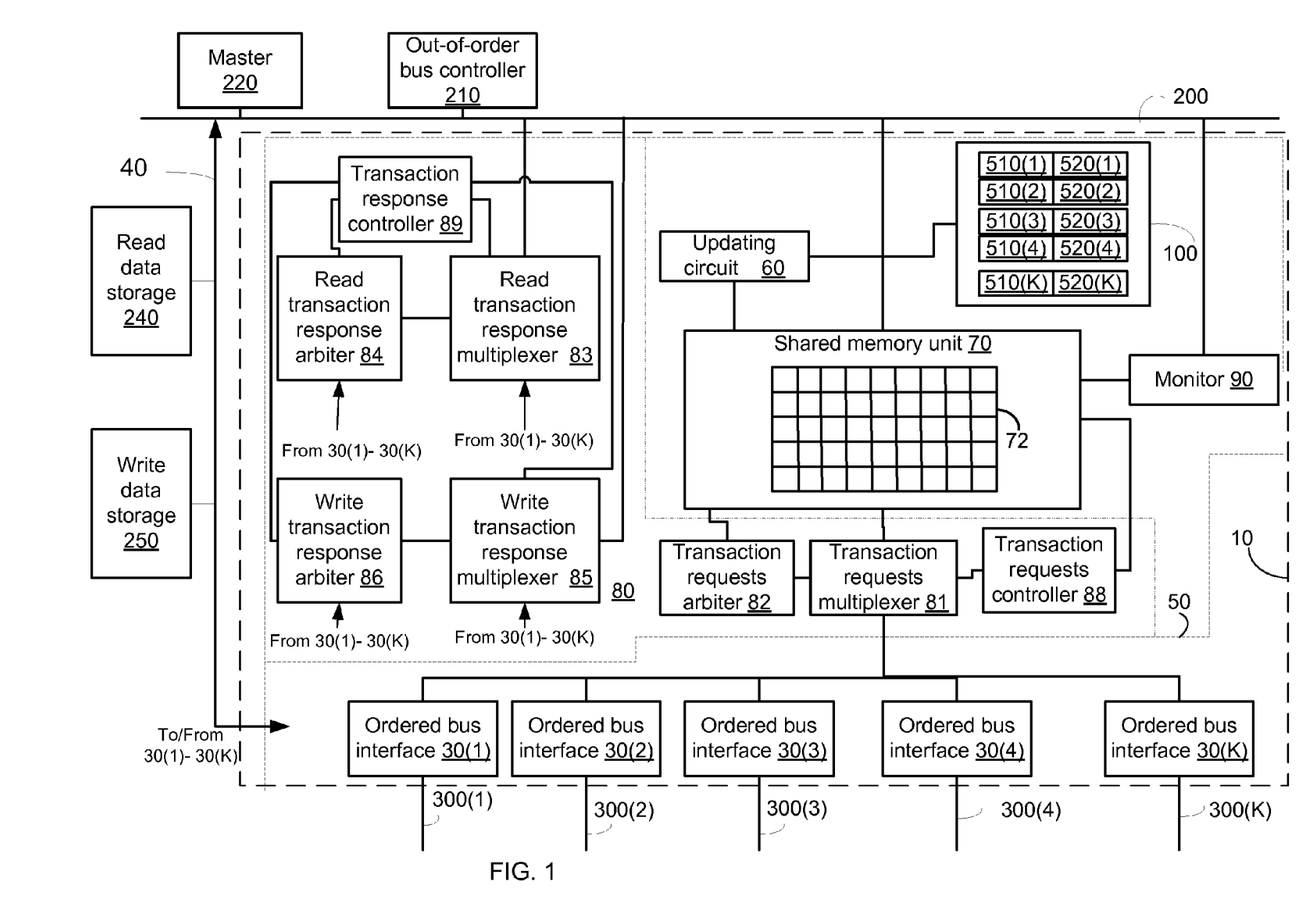
FIG. 1 schematically shows an example of an embodiment of a bus bridge and its environment.

FIG. 1 is a schematic block diagram of an example of an embodiment of a bus bridge 10 and its environment. The bus bridge 10 includes multiple ordered bus interfaces 30(1)-30(K), where K is an integer. The environment includes The environment includes a data path 40, an out-of-order bus 200, an out-of-order bus controller 210, a read data storage 240 and multiple ordered buses 300(1)-300(K). The multiple ordered buses 300(1)-300(K) are connected to the multiple ordered bus interfaces 30(1)-30(K). The k'th ordered bus 300(*k*) is connected to the k'th ordered bus interface 30(*k*), k being an index that ranges between 1 and K. Note, when referring to the ordered bus interfaces 30(1)-30(K), just the element number 30 will be used, and when referring to the ordered buses 300(1) to 300(K), just the element number 300 will be used.

The bus bridge 10 includes a flow control logic circuit 50. The flow control logic circuit 50 is connected to the out-of-order bus 200 and to the multiple ordered bus interfaces 30. The flow control logic circuit 50 is arranged to control a flow of transaction requests between the out-of-order bus 200 and each of the ordered bus interfaces 30. The flow control logic circuit 50 is also arranged to control a flow of transaction request responses (including read transaction request responses and write transaction requests) from the ordered bus interfaces 30 to the out-of-order bus 200.

Figure 2:
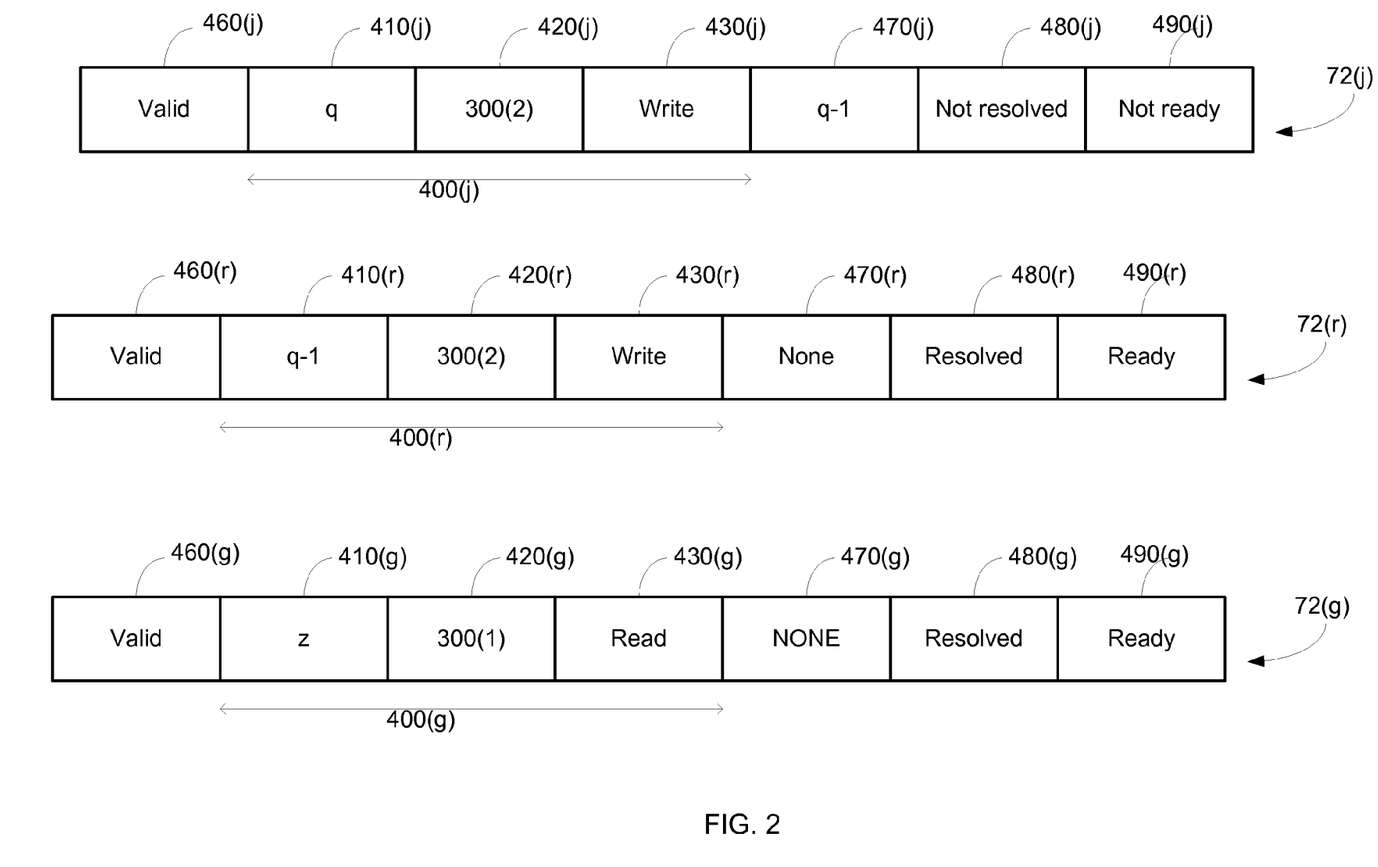
FIG. 2 schematically shows an example of an embodiment of multiple rows of a table that is stored in a shared memory unit of the bus bridge of FIG. 1.

The flow control logic 50 includes an updating circuit 60, a shared memory 70, a managing circuit 80, a monitor 90, and a tracking circuit 100. The updating circuit 60 is arranged to update dependency resolution attributes and data readiness attributes associated with transaction requests. The shared memory 70 is connected to the updating circuit 60, the managing circuit 80 and the monitor 90. The shared memory unit 70 is arranged to store transaction requests, dependency resolution attributes and data readiness attributes using a data structure such as a table 72. Each entry of the shared memory unit 70 comprises a row of the table 72. Each row of the table 72 is used to store a transaction request and attributes associated with that transaction request. FIG. 2 illustrates some rows of the table 72.

Referring again to FIG. 1, instead of having multiple long buffers per each ordered bus interface, the shared memory unit 70 is used to store multiple transaction requests. Only transaction requests that can be dequeued from the table 72 (ready transaction requests) are sent to much smaller buffers of the ordered buses interfaces 30(1)-30(k). This feature enables the bus bridge 10 to manage many transaction requests in an efficient manner. The shared memory unit 70 can store more transaction requests than any of the ordered bus interfaces 30 so that an undue duplication of resources is avoided. For example, assume that the shared memory unit 70 is arranged to store a maximal number (N) of transaction requests and each ordered bus interface is arranged to store a maximal number (M) of ready transaction requests then N>M and preferably N is much larger than M. By using the ordered bus interfaces 30, storing transaction requests aimed to multiple ordered buses 300 in the shared memory unit 70 and arbitrating between different ready transaction requests, bottlenecks caused from busy buses are avoided. A busy ordered bus will not delay the transfer of other transaction requests to other ordered buses.

The managing circuit 80 is connected to the shared memory unit 70 and to the multiple ordered bus interfaces 30. The managing circuit 80 is arranged to: (i) determine a readiness of each transaction request based on a dependency resolution attribute and a data readiness attribute associated with the transaction request, (ii) manage a dequeueing of ready transaction requests to the ordered bus interfaces 30 based on an availability of the ordered bus interfaces, and (iii) manage a flow of transaction responses from the ordered bus interfaces 30 to the out-of-order bus 200.

The dequeueing process will be explained in greater detail below. However, in a nut shell, a transaction request is ready for dequeueing if all of its dependencies are resolved (the shared memory unit 70 does not store another transaction requests that belongs to an earlier transaction cycles) and if the data associated with the transaction request is available. A ready transaction request will be sent to an ordered bus interface if it is destined to that ordered bus interface and if the ordered bus interface can receive it.

The managing circuit 80 includes: (i) a transaction request multiplexer 81 that sends ready transaction requests that won an arbitration to the relevant ordered bus interfaces 30, (ii) a transaction request arbiter 82 for arbitrating between ready transaction requests that are associated with different ordered buses 300, (iii) a read transaction response multiplexer 83 that sends read transaction request responses that won the arbitration to the out-of-order bus 200, (iv) a read transaction response arbiter 84 that is arranged to arbitrate between read transaction request responses that originate from different ordered bus interfaces 30, (v) a write transaction response multiplexer 85 that sends write transaction request responses that won the arbitration to the out-of-order bus 200; (vi) a write transaction response arbiter 86 that is arranged to arbitrate between write transaction request responses that originate from different ordered bus interfaces 30, (vii) a transaction request controller 88 that is arranged to send to the transaction request arbiter 82 and to the transaction request multiplexer 81 ready transaction requests, and (viii) transaction response controller 89 that is arranged to manage the provision of read transaction responses from ordered bus interfaces 30 to the read transaction response arbiter 84 and the read transaction response multiplexer 83 and to manage the provision of write transaction requests from ordered bus interfaces 30 to the write transaction response arbiter 86 and the write transaction response multiplexer 85.

The transaction request arbiter 82 is connected to the shared memory unit 70 and to the transaction request multiplexer 81. Each of the transaction request multiplexer 81, the read transaction response multiplexer 83, the read transaction response arbiter 84, the write transaction response multiplexer 85 and the write transaction response arbiter 86 is connected to each of the ordered bus interfaces 30.

The monitor 90 is arranged to monitor a level of fullness of the shared memory unit 70. The monitor 90 sends, to the out-of-order bus controller 210, an availability indicator that is indicative of an ability of the shared memory unit 70 to receive transaction requests. If the shared memory unit 70 is full it will not receive new transaction requests. The level of fullness can equal the number of entries that store valid content.

During a write transaction a master that is connected to the out-of-order bus 200 attempts to write data to a write data storage 250 that is accessible to each of the ordered bus interfaces 30(1)-30(k). A completion of a write transaction requires a completion of an address phase and a completion of a data phase. Each phase out of the address and data phases can include multiple transaction cycles. During the address phase the transaction requests are sent to the shared memory unit 70. During the data phase the master 220 writes data to the write data storage 250 (via data path 40) and sends to the flow control logic circuit 50 data readiness indicators indicative of the completion of data phase transaction cycles.

The write data storage 250 is connected to each of the ordered bus interfaces 30. Once data is stored in the write data storage 250 and a transaction request associated with the data is dequeued the relevant ordered bus interface 30 can retrieve the data from the write data storage 250 and send the data to the relevant ordered bus 300.

During a read transaction the master 220 tries to read data from the read data storage 240. As there is no need to wait for a data readiness indicator from the master 220, the updating circuit 60 sets the data readiness indicator in the shared memory 70.

The transaction request multiplexer 81 and the transaction request arbiter 82 manage the dequeueing of the read transaction to a target one of the ordered bus interfaces 30. The target ordered bus interface stores the read data fetched from the respective ordered bus in the read data storage 240. The target ordered bus interface 30 sends a read data readiness indicator to the out of order bus controller 210 via the read transaction response path, which includes the read transaction response multiplexer 83 and the read transaction response arbiter 84. After the out of order bus controller 210 receives this read data readiness indication it allows the master 220 to read the data from the read data storage 240.

In relation In relation to write transactions—the updating circuit 60 is arranged to: (i) receive a data readiness indicator that indicates the relevant transaction cycle and the relevant ordered bus 300, (ii) search in the shared memory unit 70 for a matching write transaction request. That is, a write transaction request that is destined to the relevant ordered bus 300 and belongs to the relevant transaction cycle, and (iii) update the data readiness attribute associated with that matching write transaction request. The updating circuit 60 can perform these actions for a write transaction request. For a read transaction request where it is assumed that data is available, the updating circuit 60 updates each data readiness attribute to indicate that the data is ready.

The tracking circuit 100 is arranges to store, for each ordered bus (for example—the k'th ordered bus 300(k)), a last transaction cycle identifier 510(k) and a pending transaction request indicator 520(k). The pending transaction request indicator 520(k) indicates whether the shared memory unit 70 stores any transaction request destined to the ordered bus 300(k). Because there are K ordered busses, the tracking circuit 100 stores 2*K identifiers, K last transaction cycle identifiers 510(1)-510(k), and K pending transaction request indicators 520(1)-520(K).

The updating circuit 60 updates the antecedent dependency attribute 470(k) (see FIG. 2) of a newly received transaction request based on the value of the last transaction cycle identifier 510(k)—it sets the antecedent dependency attribute 470 to a value that equals the penultimate transaction cycle. The updating circuit 60 also updates the last transaction cycle identifier 510 to a value that equals the transaction cycle of the newly received transaction request. A newly received read transaction request can be sent directly to transaction request arbiter 82 if there are no other pending transaction requests related to the same relevant ordered bus.

The manner in which the bus bridge 10 operates will be further illustrated by table 1 (below) and FIG. 3. It is noted that the table 72 of the shared memory unit 70 may include many more than 3 rows, and that each row can include fields that differ from those illustrated in FIG. 2.

FIG. 2 illustrates a content of rows 72(j), 72(r) and 72(g) of the table 72 of the shared memory unit 70 in accordance with an embodiment of the invention. The contents of the rows of FIG. 2 correspond to a point in time that occurs at the end of the fourth event of table 1 (below). It should be noted that the table 72 may include multiple rows, some of which may temporarily store invalid data. Row 72(j) stores a transaction request 400(j), a valid attribute 460(j), an antecedent dependency attribute 470(j), a dependency resolution attribute 480(j), and data readiness attribute 490(j).

The valid attribute 460(j) is indicative of a validity of the entry 72(j). It indicates that row 72(j) stores a valid transaction request 400(j). This attribute can be set when a transaction request is written to entry 72(j) and can be reset once the transaction requests is dequeued from the shared memory unit 70. The transaction request 400(j) includes a transaction cycle attribute 410(j), an ordered bus attribute 420(j) and a transaction type attribute 430(j). The transaction cycle attribute 410(j) indicates the transaction cycle of transaction request 400(j). It is assumed that transaction request 400(j) belongs to the q'th transaction cycle. The ordered bus attribute 420(j) indicates the relevant ordered bus, that is the ordered bus to which the transaction request 400(j) is destined. It is assumed that transaction request is destined to the ordered bus 300(2).

The transaction type attribute 430(j) indicates that transaction request 400(j) is a write transaction request. The antecedent dependency attribute 470(j) indicates that shared memory unit 70 stores an antecedent transaction request (400(r)) that belongs to the (q-1)'th transaction cycle.

Row 72(r) stores the antecedent transaction request 400(r), a valid attribute 460(r), an antecedent dependency attribute 470(r), a dependency resolution attribute 480(r), and data readiness attribute 490(r). The valid attribute 470(r) indicates that the content of row 72(j) is valid. The transaction request 400(r) includes a transaction cycle attribute 410(r), an ordered bus attribute 420(r) and a transaction type attribute 430(r).

The transaction cycle attribute 410(r) indicates that transaction request 400(r) belongs to the (q-1)'th transaction cycle. The ordered bus attribute 420(r) indicates that the relevant ordered bus is ordered bus 300(2). The transaction type attribute 430(r) indicates that transaction request 400(r) is a write transaction request.

The antecedent dependency attribute 470(r) indicates that transaction request 400(r) is not dependent on any other transaction request. Accordingly, when data readiness attribute 490(r) will indicate that the data for 400(r) is ready then transaction request 400(r) will be ready for being dequeued from the shared memory unit 70.

Row 72(g) stores a transaction request 400(g), a valid attribute 460(g), an antecedent dependency attribute 470(g), a dependency resolution attribute 480(g), and data readiness attribute 490(g). The valid attribute 470(g) indicates that row 72(g) stores a valid transaction request 400(g). The transaction request 400(g) includes a transaction cycle attribute 410(g), an ordered bus attribute 420(g) and a transaction type attribute 430(g). The transaction cycle attribute 410(g) indicates that the transaction request 400(g) belongs to the z'th transaction cycle. The ordered bus attribute 420(g) indicates that the relevant (target) ordered bus is 300(1). The transaction type attribute 430(g) indicates that transaction request 400(g) is a read transaction. The antecedent dependency attribute 470(g) indicates that transaction request 400(g) does not depend on any other transaction request.

Because transaction request 400(g) is a read transaction request then data readiness attribute 490(g) indicates that the data for 400(g) is ready and transaction request 400(g) is ready for being dequeued from the shared memory unit 70.

Table 1 will illustrates various updates of table 72 and various updated of last transaction cycle identifiers 510(1), 510(2) and pending transaction request indicators 520(1) and 520(2). These updates follow various events. These events include a reception of transaction requests, dequeueing of transaction requests and receiving data readiness indicators.

TABLE 1

| # Event | Content of rows | Updates | Comments |
|---|---|---|---|
| 1 Receive transaction request 400(r) | 410(r) = (q-1).<br>420(r) = 300(2).<br>430(r) = write.<br>460(r) = valid.<br>470(r) = no antecedent.<br>480(r) = dependency resolved.<br>490(r) = not ready. | 510(2) = (q-1).<br>520(2) = pending. | 400(r) will be ready for dequeueing once data is received |
| 2 Receive transaction request 400(g) | 410(g) = z.<br>420(g) = 300(1).<br>430(g) = read.<br>460(g) = valid.<br>470(g) = no antecedent. | 510(1) = z.<br>520(1) = pending. | 400(g) is ready for dequeueing |

TABLE 1-continued

| # Event | Content of rows | Updates | Comments |
|---|---|---|---|
| | 480(g) = dependency resolved. 490(g) = ready. | | |
| 3 Receive data readiness indicator that indicates that data for the (q-1)'th transaction cycle for ordered bus 300(2) is ready. | 490(r) = Ready. | | 400(r) is be ready for dequeueing |
| 4 Receive transaction request 400(j) | 410(j) = q. 420(j) = 300(2). 430(j) = write. 460(j) = valid. 470(j) = (q-1). 480(j) = dependency not resolved. 490(j) = not ready. | 510(2) = q. 520(2) = pending. | 400(j) is not ready for dequeueing once data is received |
| 5 Transaction request 400(g) is dequeued | 460(g) = not valid | 510(1) = don't care. 520(1) = empty. | There are no pending transaction requests |
| 6 Transaction request 400(r) is dequeued | 460(r) = not valid. 470(j) = no antecedent 480(j) = dependency resolved. 490(j) = not ready. | 510(2) = q. 520(2) = pending. | 400(j) is ready for dequeueing once data is received |
| 8 Receive data readiness indicator that indicates that data for the q'th transaction cycle for ordered bus 300(2) is ready. | 490(j) = Ready. | 510(2) = q. 520(2) = pending. | 400(j) is be ready for dequeueing |
| 9 Transaction request 400(j) is dequeued | 460(j) = not valid. | 510(2) = don't care. 520(2) = empty. | Table 72 is empty |

As illustrated above, the updating circuit 60 is arranged to update a dependency resolution attribute of a transaction request that is destined to a relevant ordered bus, based on the last transaction cycle identifier and the pending transaction request indicator associated with the relevant ordered bus. The updating circuit 60 also updates the values of the last transaction cycle identifiers 520(1)-520(K), when there are no more pending request in the shared memory unit 70 for the same port 300 (1)-300 (K). When a new transaction request arrives then updating circuit 60 updates antecedent dependency attribute 470 to equal the previous value of the transaction cycle identifier.

As another example, once a transaction request 400(j) is dequeued from the shared memory unit 70, the updating circuit 60 updates the pending transaction request indicator 520(2) to indicate that the table 72 does not include any transaction requests destined to the first ordered bus 300(1).

Figure 3:
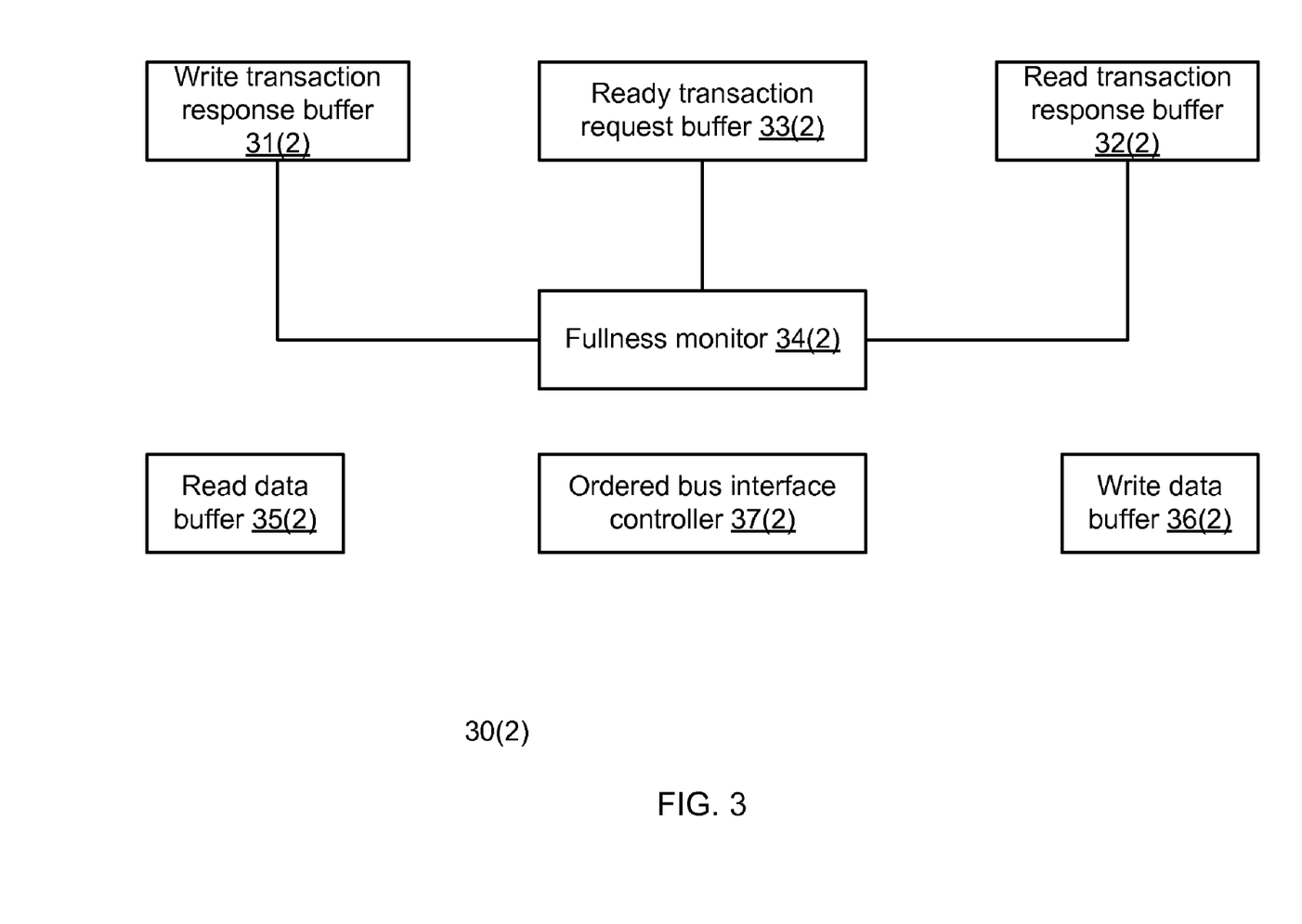
FIG. 3 schematically shows an example of an embodiment of an ordered bus interface.

FIG. 3 is a schematic diagram of an ordered bus interface 300(2) in accordance with another embodiment of the present invention. The ordered bus interface 30(2) includes write transaction response buffer 31(2), read transaction response buffer 32(2), ready transaction request buffer 33(2), fullness monitor 34(2), read data buffer 35(2), write buffer 36(2), and ordered bus interface controller 37(2). The fullness monitor 34(2) monitors the availability of write transaction response buffer 31(2), read transaction response buffer 32(2) and ready transaction request buffer 33(2). The fullness monitor 34(2) is arranged to send to the transaction request controller 88 logic an availability indication that indicates that ordered bus interface 30(2) can receive more ready transaction requests.

The read data buffer 35(2) receives data from the ordered bus 300(2) and sends the data to the read data storage 240. The write data buffer 36(2) receives data from the write data storage 250 and sends the data to the ordered bus 300(2). The ordered bus interface controller 37(2) is connected to the other circuits of the ordered bus interface 30(2) and controls these circuits.

Figure 4:
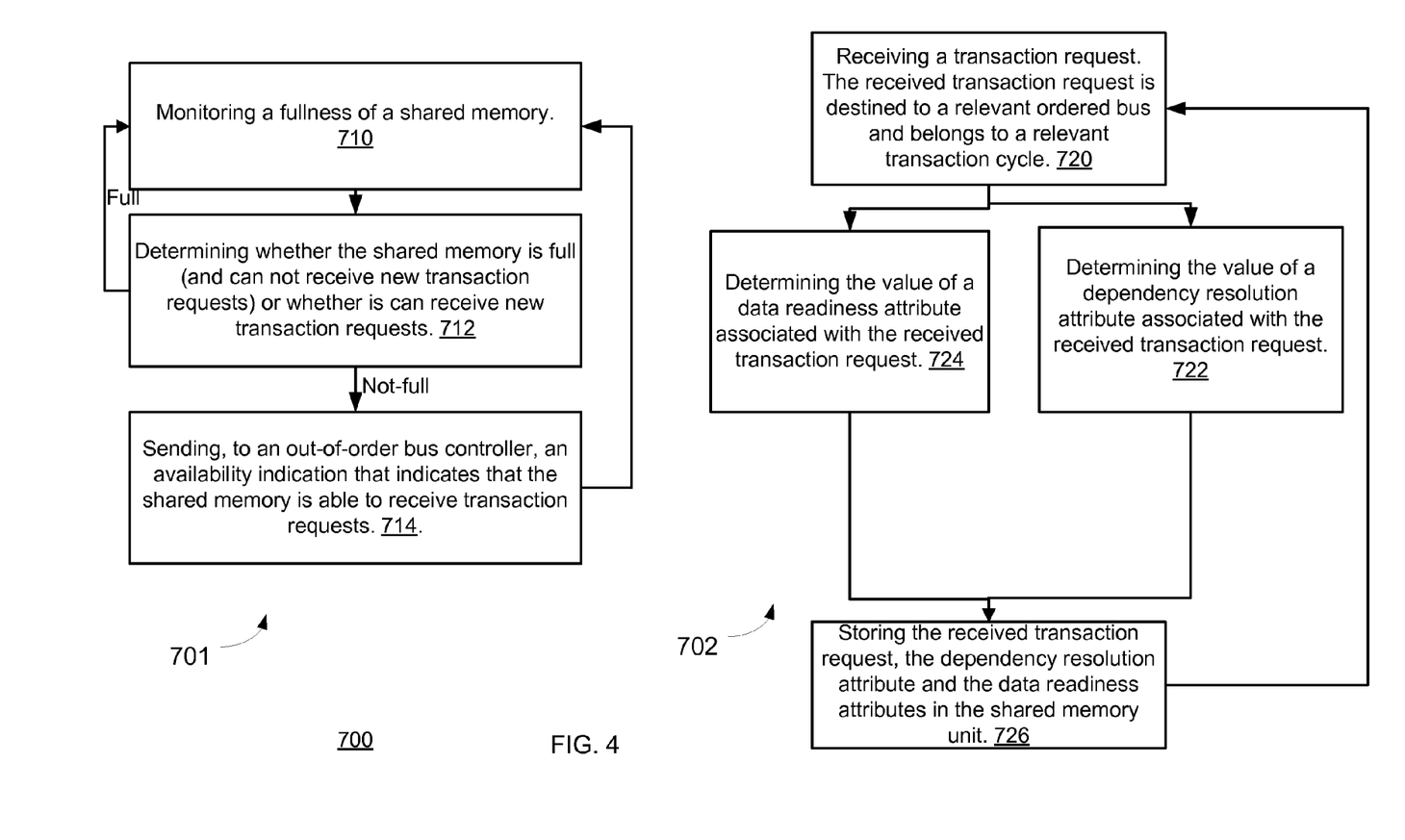
FIGS. 4, 5 and 6 schematically show examples of embodiments of methods for interfacing an out-of-order bus and multiple ordered buses.
Figure 5:
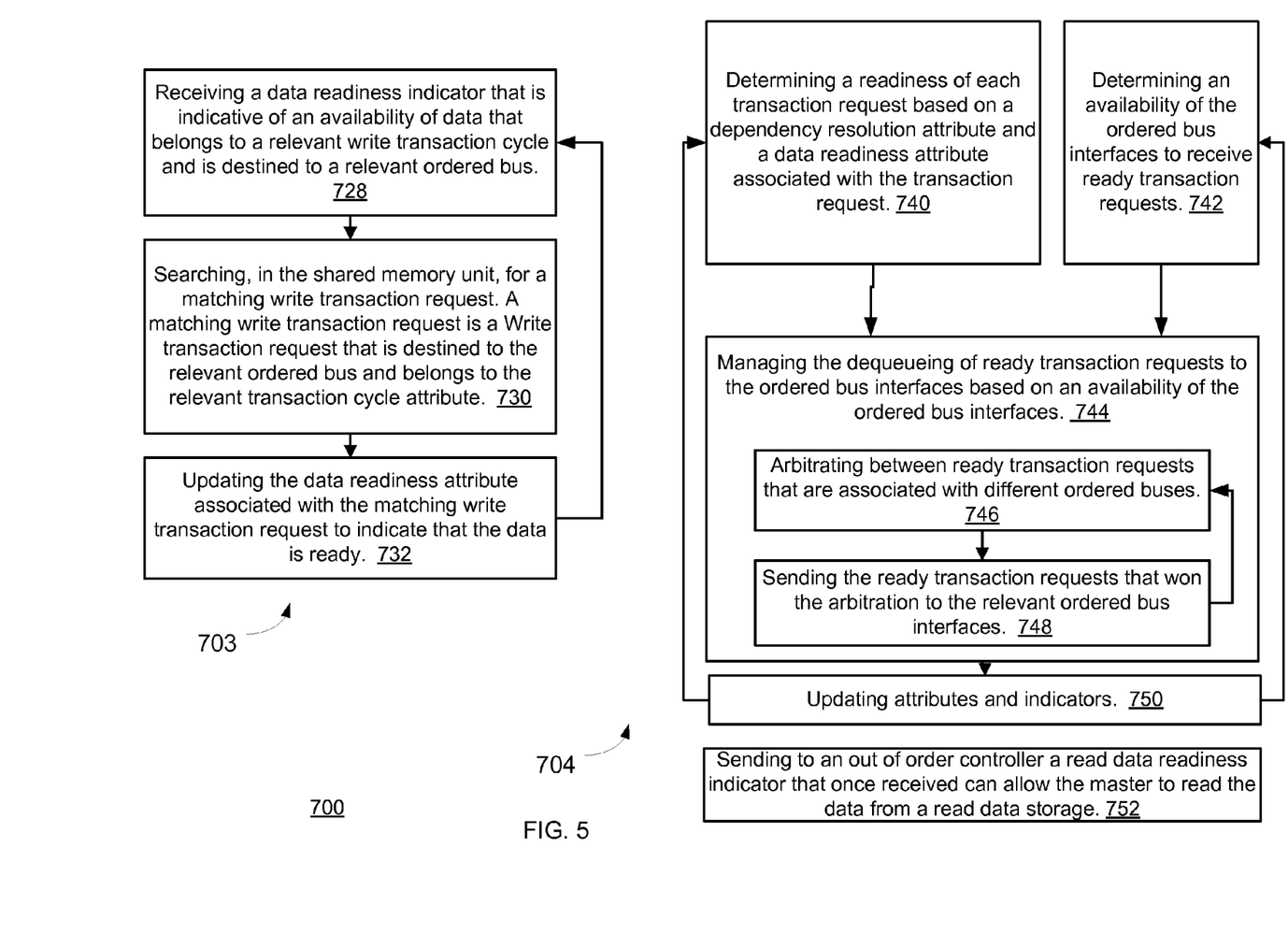

FIGS. 4 and 5 are flow charts illustrating an example of a method 700 for interfacing an out-of-order bus and multiple ordered buses. The method 700 includes multiple groups of stages that can be executed in parallel to each other, in a partially overlapping manner or in a serial manner. Different groups of stages can be executed by different components of an integrated circuit that includes the bus bridge. FIG. 4 illustrates the first and second groups of stages 701 and 702 and FIG. 5 illustrates the third and fourth groups of stages 703 and 704.

The first group of stages 701 includes stages 710, 712 and 714. Stage 710 includes monitoring a fullness of a shared memory. The shared memory can store one or more transaction requests. Stage 710 is followed by stage 712, which is for determining whether the shared memory is full (and can not receive new transaction requests) or whether is can receive new transaction requests. If the shared memory is not full then stage 712 is followed by stage 714.

Stage 714 includes sending, to an out-of-order bus controller, an availability indicator that indicates that the shared memory is able to receive transaction requests. Stage 714 is followed by stage 710. If the shared memory is full then stage 712 is followed by stage 710.

The second group of stages 702 includes stages 720, 722, 724 and 726. The second group of stages 702 starts when a new transaction request is received. Stage 720 includes receiving a transaction request. The received transaction request is destined to a relevant ordered bus and belongs to a relevant transaction cycle. Stage 720 is followed by stages 722 and 724.

Stage 722 includes determining the value of a dependency resolution attribute associated with the received transaction request. Stage 722 may include setting the data readiness value attribute (to indicate that the data is ready) if the received transaction request is a read transaction request. Stage 722 also may include setting the dependency resolution attribute (to indicate that the data dependency resolution was solved) if the shared memory unit does not currently store any other transaction request that is destined to the relevant ordered bus. Stage 722 can include determining the value of the dependency resolution attribute based on a value of a pending transaction request indicators of the relevant ordered bus. For a write transaction request, stage 722 may reset the data readiness attribute if the write data readiness indication is not coming along with the received transaction request.

Stage 724 includes determining the value of a data readiness attribute associated with the received transaction request. Stage 722 and 724 are followed by stage 726 of storing the received transaction request, the dependency resolution attribute and the data readiness attributes in the shared memory unit. When stage 726 is finished, the method returns to stage 720.

Referring now to FIG. 5, the third group of stages 703 includes stages 728, 730 and 732. The third group of stages starts when a data readiness indicator is received.

Stage 728 includes receiving a data readiness indicator that indicates an availability of data that corresponds to a relevant transaction cycle and is destined to a relevant ordered bus. Stage 728 is followed by stage 730. Stage 730 comprises searching, in the shared memory unit, for a matching write transaction request. A matching write transaction request is a write transaction request that is destined to the relevant ordered bus and belongs to the relevant transaction cycle. Stage 730 is followed by stage 732, which comprises updating the data readiness attribute associated with the matching write transaction request to indicate that the data is ready. Stage 732 is followed by stage 728.

The fourth group of stages 704 includes stages 740, 742, 744, 746, 748 and 750. The fourth group of stages 704 starts at stages 740 and 742. Stage 740 includes determining a readiness of each transaction request based on a dependency resolution attribute and a data readiness attribute associated with the pending transaction request. A transaction request is deemed ready only if all dependencies were resolved and the data is ready. The read transaction request is deemed ready if all dependencies were resolved.

Stage 742 includes determining an availability of the ordered bus interfaces to receive ready transaction requests. It is suffice that an ordered bus interface of a certain bus interface will be ready to receive transaction requests that are aimed to that certain bus. Thus, even if one or more ordered bus interfaces are full it does not prevent the provision of transaction requests to other (available) ordered bus interfaces. Stages 740 and 742 are followed by stage 744.

Stage 744 includes managing the dequeueing of ready transaction requests to the ordered bus interfaces based on an availability of the ordered bus interfaces. Stage 744 includes managing a dequeueing of ready transaction requests that are destined to a relevant order bus to the corresponding ordered bus interface. Stage 744 may include stage 746 and 748.

Stage 746 includes arbitrating between ready transaction requests that are associated with different ordered buses. The arbitration of stage 746 can take into account only ready transaction requests that are destined to available ordered bus interfaces. Stage 748 includes dequeueing the ready transaction requests that won the arbitration to the relevant ordered bus interfaces. Stage 748 is followed by stage 750.

Stage 750 includes updating attributes and indicators. More particularly, stage 750 includes at least one of the following: (i) updating the relevant last transaction cycle identifier—it should reflect the penultimate transaction cycle identifier; (ii) checking if the shared memory unit still stores other transaction requests of the dequeued transaction request and destined to the same ordered bus interface—and if there are none—updating the pending transaction request indicator of that ordered bus interface; (iii) checking if another transaction attribute depended on the dequeued transaction request—and if so—updating the antecedent dependency attribute; (iv) updating the validity attribute to indicate that the row that stored the dequeued transaction request is invalid; (v) updating attributes of other transaction requests that depended on the dequeued transaction request.

The method 700 may also include stage 752. Stage 752 includes sending to an out of order controller a read data readiness indicator that once received can allow the master to read the data from a read data storage. Stage 752 also can include sending the out of order controller the read data readiness indicator via a read transaction response path.

Stage 750 is followed by stages 740 and 742.

Figure 6:
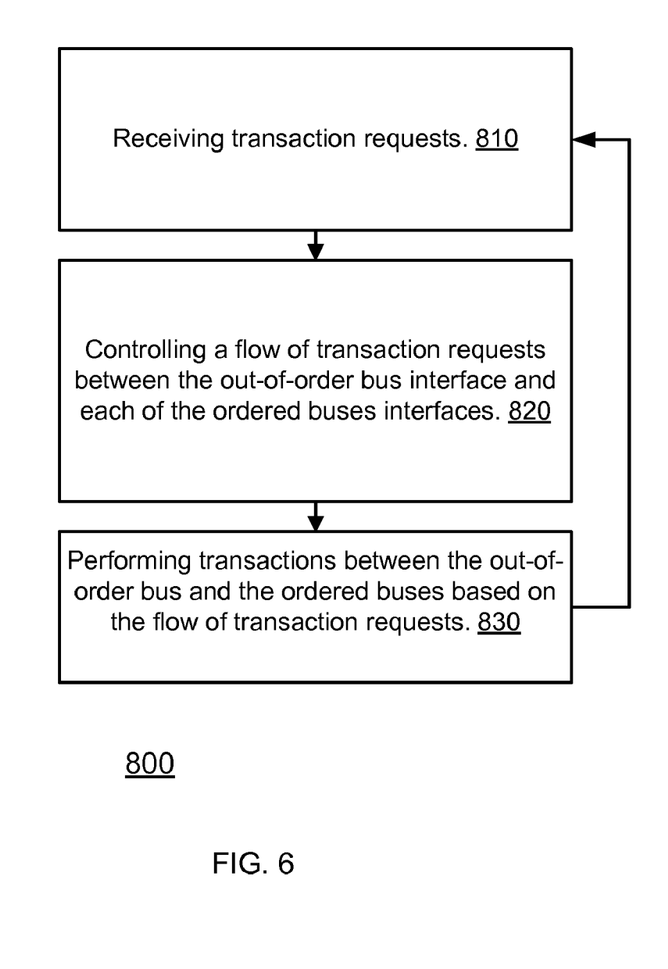

FIG. 6 is a flow chart of an example of a method 800 for interfacing an out-of-order bus and multiple ordered buses. The method 800 includes three stages, 810, 820 and 830. Stage 810 includes receiving transaction requests. Stage 810 is followed by stage 820, which includes controlling a flow of transaction requests between the out-of-order bus interface and each of the ordered buses interfaces. Stage 820 may include any stage of the method 700 or a combination thereof. Stage 820 is followed by stage 830, which is performing transactions between the out-of-order bus and the ordered buses based on the flow of transaction requests.

In the foregoing specification, the invention has been described with reference to specific examples of embodiments of the invention. It will, however, be evident that various modifications and changes may be made therein without departing from the broader spirit and scope of the invention as set forth in the appended claims. Those skilled in the art will recognize that the boundaries between logic blocks are merely illustrative and that alternative embodiments may merge logic blocks or circuit elements or impose an alternate decomposition of functionality upon various logic blocks or circuit elements. Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Further, those skilled in the art will recognize that boundaries between the above described operations merely illustrative. The multiple operations may be combined into a single operation, a single operation may be distributed in additional operations and operations may be executed at least partially overlapping in time. Alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type. The invention also is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, the word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A bus bridge, comprising:
   multiple ordered bus interfaces, wherein each ordered bus interface is coupled to an ordered bus; and
   a flow control logic circuit, coupled to the out-of-order bus and the multiple ordered bus interfaces, for controlling a flow of transaction requests between the out-of-order bus and each of the ordered bus interfaces;
   wherein the flow control logic circuit includes:
      an updating circuit, for updating dependency resolution attributes and data readiness attributes associated with transaction requests;
      a shared memory unit, for storing the dependency resolution attributes, the data readiness attributes and the transaction requests, wherein the transaction requests are destined to the ordered buses; and
      a managing circuit, coupled to the shared memory unit and to the multiple ordered bus interfaces, for determining a readiness of each transaction request based on a dependency resolution attribute and a data readiness attribute associated with the transaction request, and for managing a dequeueing of ready transaction requests to the ordered bus interfaces based on an availability of the ordered bus interfaces.

2. The bus bridge according to claim 1, wherein the managing circuit comprises a transaction request arbiter for arbitrating between ready transaction requests that are associated with different ordered buses.

3. The bus bridge according to claim 1, further comprising a monitor for monitoring a level of fullness of the shared memory unit and for sending, to an out-of-order bus controller, an availability indicator that is indicative of an ability of the shared memory to receive ready transaction requests.

4. The bus bridge according to claim 1, wherein the updating circuit is arranged to receive a data readiness indicator that is indicative of an availability of data that corresponds to a relevant transaction cycle and is destined to a relevant ordered bus, to search in the shared memory unit for a matching write transaction request, and to update the data readiness attribute associated with the matching write transaction request.

5. The bus bridge according to claim 1, wherein the updating circuit is arranged to update the data readiness attribute of a read transaction request to indicate that the data of the read transaction request is ready.

6. The bus bridge according to claim 1, wherein the flow control logic circuit is arranged to control a flow of transaction request responses from the ordered bus interfaces to the out-of-order bus interface; and wherein the flow control logic circuit further comprises a transaction response arbiter for arbitrating between transaction request responses that originate from different ordered bus interfaces.

7. The bus bridge according to claim 1, wherein the shared memory unit is arranged to store a maximal number of transaction requests and each ordered bus interface is arranged to store a maximal number of ready transaction requests; and wherein the maximal number of transaction requests is greater than the maximal number of ready transaction requests.

8. The bus bridge according to claim 1, wherein the flow control logic circuit further comprises a tracking circuit for storing, for each ordered bus, a last transaction cycle identifier and a pending transaction request indicator, wherein the pending transaction request indicator indicates whether the shared memory unit stores a transaction request destined to the ordered bus; and
   wherein the updating circuit is arranged to update a dependency resolution attribute of a transaction request that is destined to a relevant ordered bus, based on the last transaction cycle identifier and the pending transaction request indicator associated with the relevant ordered bus.

9. The bus bridge according to claim 1, wherein the updating circuit is arranged to update a value of the last transaction cycle identifier and to update the pending transaction request indicator upon a dequeueing of a ready transaction request from the shared memory.

10. The bus bridge according to claim 1, wherein each entry of the shared memory is arranged to store a valid indicator indicative of a validity of the entry, a pending transaction request, an antecedent dependency attribute indicative of an antecedent pending transaction, a dependency resolution attribute and a data readiness attribute.

11. A method for interfacing an out-of-order bus and multiple ordered buses, comprising:
   receiving transaction requests from the out-of-order bus;
   controlling a flow of transaction requests between the out-of-order bus and each of the ordered buses interfaces; and
   performing transactions between the out-of-order bus and the ordered buses based on the flow of transaction requests;
   wherein controlling of the flow of transaction requests comprises:
      updating dependency resolution attributes and data readiness attributes associated with transaction requests;
      storing transaction requests, dependency resolution attributes and data readiness attributes;
      determining a readiness of each transaction request based on a dependency resolution attribute and a data readiness attribute associated with the transaction request; and managing a dequeueing of ready transaction requests to the ordered bus interfaces based on an availability of the ordered bus interfaces.

12. The method according to claim 11, further comprising arbitrating between ready transaction requests that are associated with different ordered buses.

13. The method according to claim 11, wherein the transaction requests, dependency resolution attributes and data readiness attributes are stored in a shared memory unit, and wherein the method further comprises:

monitoring a level of fullness of the shared memory unit; and sending, to an out-of-order bus controller, an availability indicator that is indicative of an ability of the shared memory to receive transaction requests.

14. The method according to claim 13, further comprising:

receiving a data readiness indicator that is indicative of an availability of data that corresponds to a relevant transaction cycle and is destined to a relevant ordered bus;

searching the shared memory unit for a matching write transaction request; and updating the data readiness attribute associated with the matching write transaction request.

15. The method according to claim 11, further comprising updating the data readiness attribute of a read transaction request to indicate that the data of the read transaction request is ready.

16. The method according to claim 11, further comprising: controlling a flow of transaction request responses from the ordered bus interfaces to the out-of-order bus, wherein the controlling comprises arbitrating between transaction request responses that originate from different ordered bus interfaces.

17. The method according to claim 11, further comprising:

storing in a shared memory unit a maximal number of pending transaction requests and storing in each ordered bus interface a maximal number of ready transaction requests;

wherein the maximal number of pending transaction requests is greater than the maximal number of ready transaction requests.

18. The method according to claim 11, further comprising:

storing in a shared memory unit, for each ordered bus, a last transaction cycle identifier and a pending transaction request indicator; and updating a dependency resolution attribute of a transaction request that is destined to a relevant ordered bus, based on the last transaction cycle identifier and the pending transaction request indicator associated with the relevant ordered bus.

19. The method according to claim 18, further comprising:

updating a value of the last transaction cycle identifier; and updating the pending transaction request indicator upon a dequeueing of an associated ready transaction request from the shared memory.

20. The method according to claim 19, further comprising storing in each entry of the shared memory unit a valid indicator indicative of a validity of the entry, a pending transaction request, an antecedent dependency attribute indicative of an antecedent pending transaction, a dependency resolution attribute and a data readiness attribute.

* * * * *